United States Patent [19]

Richards et al.

[11] Patent Number: 5,269,090
[45] Date of Patent: Dec. 14, 1993

[54] HOOK AND LEADER STORAGE BOX FOR FISHERMEN

[75] Inventors: William D. Richards; Marvel L. Richards, both of 128 Muir Rd., Martinez, Calif. 94553

[73] Assignees: William D. Richards; Marvel L. Richards, Martinez, Calif.

[21] Appl. No.: 827,695

[22] Filed: Jan. 27, 1992

[51] Int. Cl.$^5$ .............................................. A01K 97/06
[52] U.S. Cl. ...................................................... 43/57.2
[58] Field of Search ............... 43/57.2, 57.1; D22/134, D22/199; D3/37; 206/315.11

[56] References Cited

U.S. PATENT DOCUMENTS

| | | | |
|---|---|---|---|
| 197,935 | 12/1877 | Holt | 43/57.2 |
| 2,760,296 | 8/1956 | Faul | 43/57.2 |
| 2,836,005 | 5/1958 | Jerdee | 43/57.2 |
| 4,577,433 | 3/1986 | Jones | 43/57.2 |

FOREIGN PATENT DOCUMENTS 0970506 1/1951 France ................... 43/57.2

Primary Examiner—Richard K. Seidel
Assistant Examiner—Jeanne M. Elpel

[57] ABSTRACT

A hook and leader storage box for fishermen, in most cases, a container used for holding factory tied fish hooks, hand tied fish hooks, and hand tied fishing leaders, that is buoyant and will float. The hook and leader storage box for fishermen is used in most cases for storage of tied hooks to fishing line. The top and bottom of each side of the hinged folding halves are notched for the loop on the end of the fishing line to secure to. Dowels for holding the loops of a snelled hook are also used. Under each notch is a hole for an elastic loop to be drawn through and fastened over the notch to secure the elastic loop. The elastic loop is pulled down to the fishing hook for attachment of the fishing hook to the elastic loop. When the elastic loop and fishing hook are attached it secures the hook and line within the hook and leader storage box. There are no lines or hooks outside the hook and leader storage box to catch on or be damaged by any other equipment while fishing. The two halves have a locking clasp to keep the hook and leader storage box for fishermen securely closed. The hook and leader storage box for fishermen can be carried in a shirt or pants pocket or most pockets on a persons clothing without being snagged by a fishing hook.

3 Claims, 4 Drawing Sheets

HOOK AND LEADER STORAGE BOX FOR FISHERMEN

BACKGROUND OF THE INVENTION

The present invention relates to a novel and useful design for a carrying case for tied fishing hooks and leaders. It will keep the hooks and leaders from being tangled with other fishing tackle in a fisherman's fishing box or while being carried in clothing pockets, back packs, or any other place a hook may be snagged. It is designed like a book so that when closed the hooks and lines are protected from damage. The box will float if dropped in water thus providing a safeguard against loss under water. The present invention is the only invention that allows fishing hooks and leaders to be stored safely from damage.

It is the only hook and leader storage box for fishermen that allows fishing leaders of any length to be stored. It is the only hook and leader storage for fishermen that closes like a book to protect hooks and leaders. It is the only hook and leader storage box for fishermen that will float in water. It is also the only hook and leader storage box for fishermen to use replaceable elastic loops to secure hooks and leaders in place, and is the only hook and leader storage box for fishermen designed to be carried in clothing pockets.

The current state of the art doesn't show a hook and leader storage box for fishermen designed to avoid snagging other articles such as lures, jigs, etc.

No prior art exist that shows these functions. No prior art reference describes or suggests the structure which would perform these functions.

SUMMARY OF THE INVENTION

In accordance with the present invention a novel and useful hook and leader storage box for fishermen is provided.

The hook and leader storage box for fishermen of the present invention includes a storage box for hooks and leaders that protects them from being caught on other objects by being contained within a folding container that has notches at each end for the leader (line) to wrap around which is indented toward the center of the container. The hooks are attached to the elastic loops which are attached through a hole and secured by the notches which secure the hooks within the center of the container to keep hooks and leaders from tangling. The container can be placed in pockets or other storage devices without becoming hooked or tangled on other materials.

It may be apparent that a novel and useful hook and leader storage box for fishermen is provided not shown in the prior art.

It is therefore an object of the present invention to provide a hook and leader storage box for fishermen for storage to any fisherman who requires safe storage of his fishing tackle.

It is yet another object of the present invention to provide a safe storage container for hooks and leaders that will float and not be lost under water.

It is yet another object of the present invention to provide a safe container for fishermen to keep their hooks and leaders from snagging and tangling with other equipment.

The invention possesses other objects of advantages, especially as concerns particular characteristics and features thereof which will become apparent as the specification continues.

DESCRIPTION OF THE PREFERRED EMBODIMENT

Figure 1:
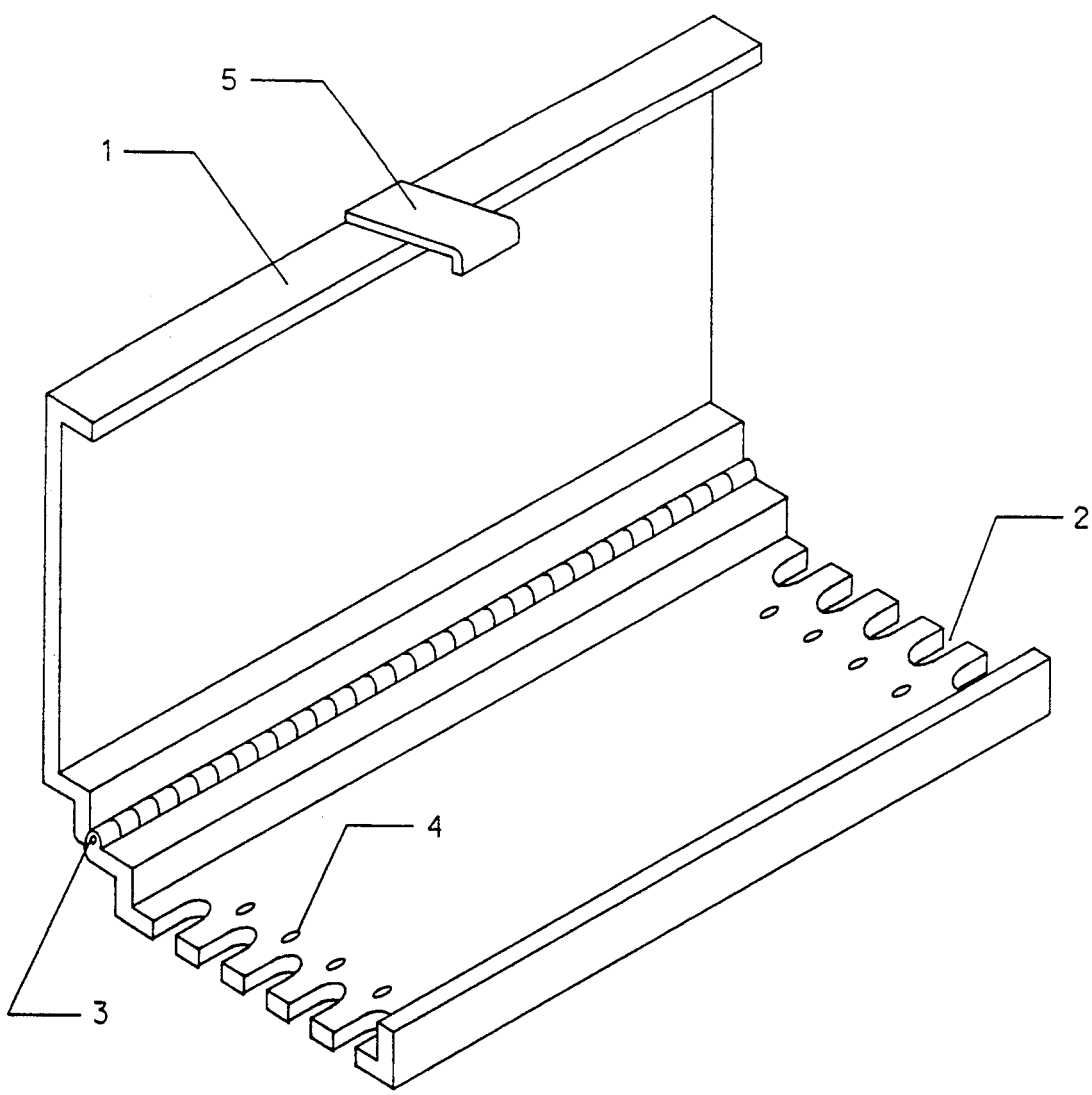
FIGS. 1 and 3 are drawings depicting the overall scheme of the present invention.

FIG. 1 shows a hook and leader storage box for fishermen 1 that can be extruded or injected plastic, corrosion resistant metal, or wood. Notches 2 will hold elastic loops 8 and fishing line 10 shown on FIG. 2. Locking clasp 4 is designed to keep both halves of the complete hook and leader storage box for fishermen 1 in the closed position when hinges 3 allow the hook and leader storage box for fishermen to be closed. Holes 5 are for attaching elastic loops through.

Figure 2:
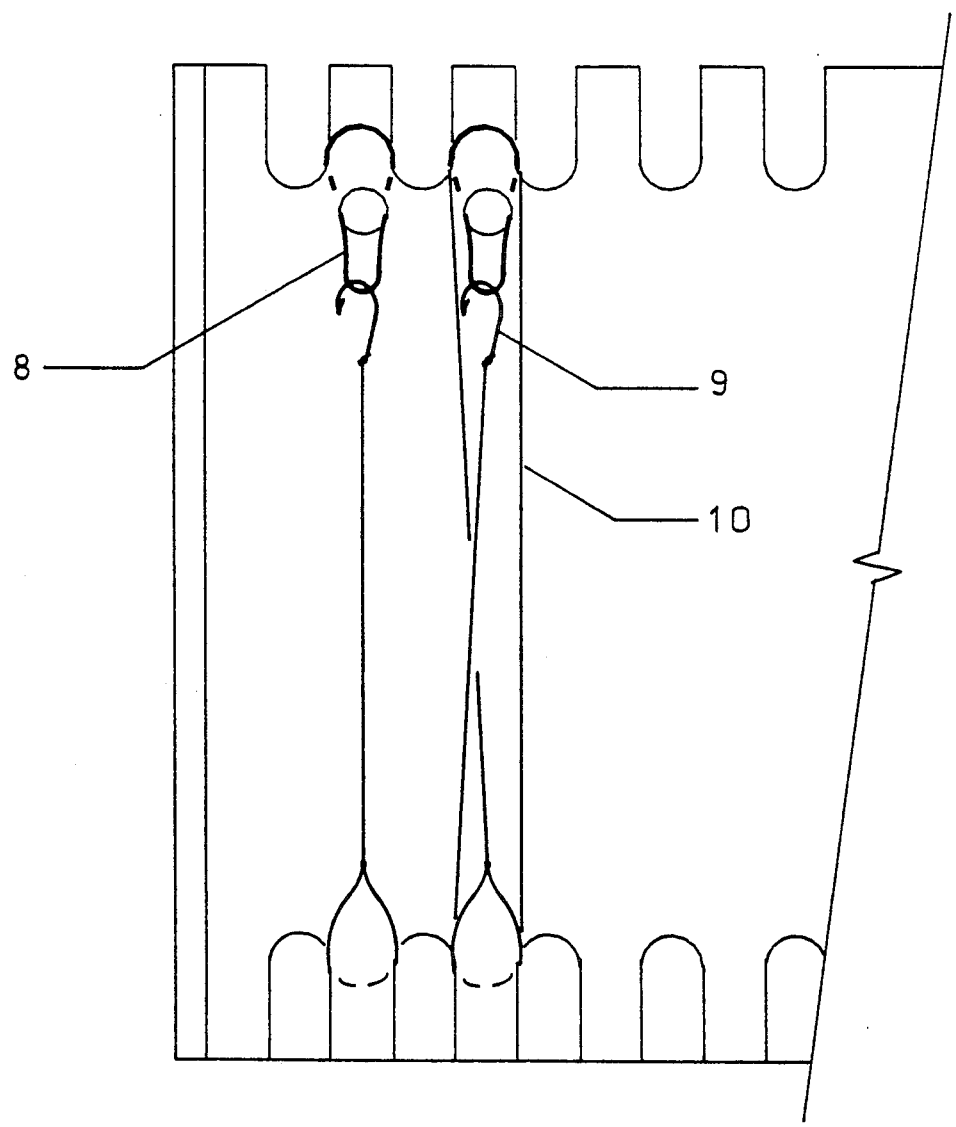
FIGS. 2 and 4 are drawings depicting how hooks, leaders and elastic loops connect to the invention.

FIG. 2 shows elastic loops 8 holding fishing hook 9 that fishing line 10 is attached to. Fishing line 10 is then looped around notches 2 in FIG. 1.

Figure 3:
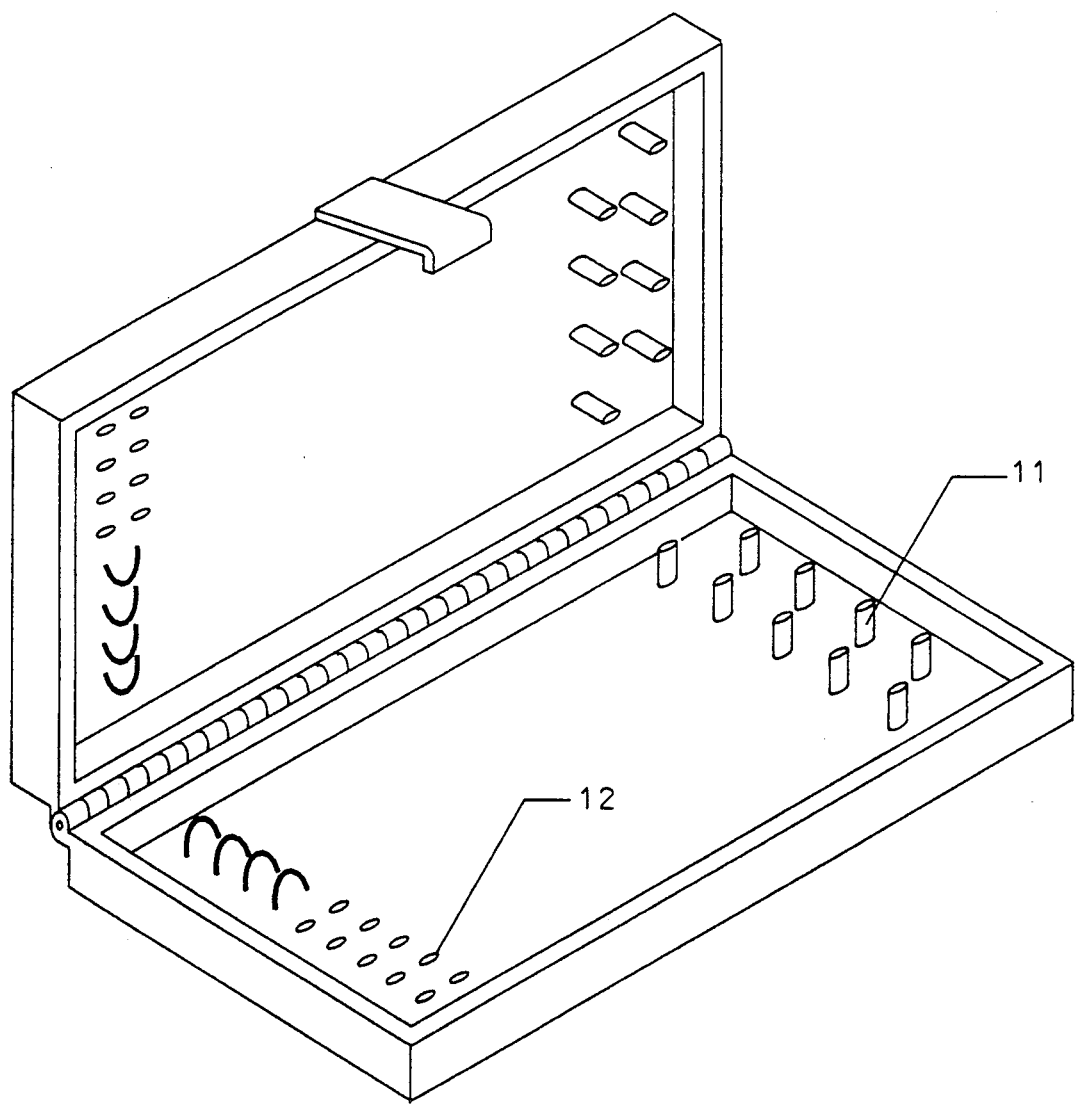

FIG. 3 shows a dowel 11 that will allow a loop of a snelled hook to attach to. Holes 12 allow an elastic loop to be extended through for attachment of another elastic loop for attachment of a fishing hook.

Figure 4:
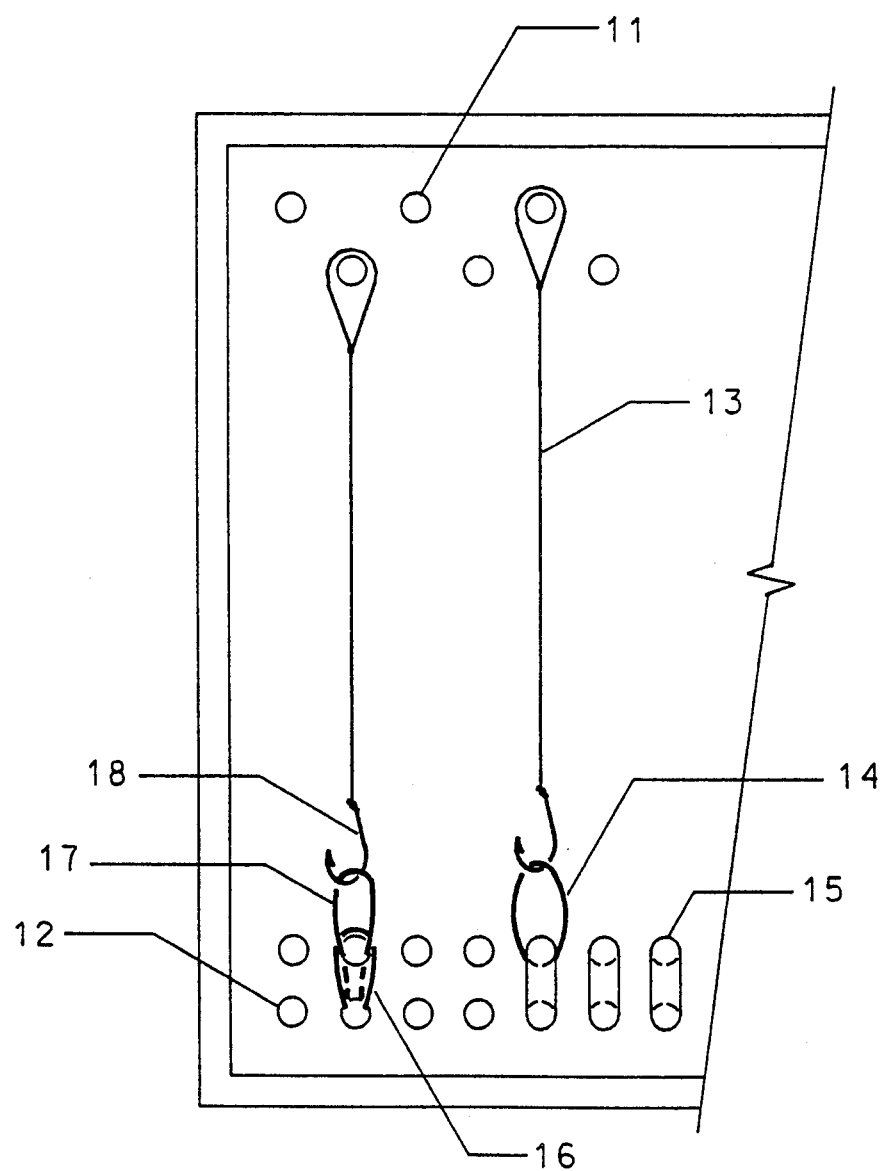

FIG. 4 shows the snelled hook 13 attached to dowel 11 shown on FIG. 3. FIG. 4 also shows an elastic loop 14 attached to a retaining loop 15. Elastic loop 16 and 17 is a single loop drawn through the bottom and top holes 12 to form two loops shown as 16 and 17 on FIG. 4. Hook 18 is shown attached to said loop 17.

What is claimed is:

1. A hook and leader storage box for a fisherman comprising,
    a folding container defining a chamber therein for the storage of hooks and leaders, said folding container having two mating halves, said halves hinged together and having a locking clasp to lock said folding container in a closed position,
    at least one of said folding container halves having a first snelled hook retaining means,
    said first snelled hook retaining means having at least one row of dowels, and at least a first and second row of holes, said rows aligned parallel to each other, a pair of holes comprising a hole from each of said first and second row of holes, said pair of holes longitudinally aligned with a dowel from said at least one row of dowels,
    said first snelled hook retaining means including an elastic loop having a first and second end opposite each other, said first and second ends threaded through said pair of holes, wherein said first end threaded through said hole from said first row of holes and said second end threaded through said hole from said second row of holes, and said elastic loop first end threaded through said elastic loop second end,
    whereby a snelled hook is retained in said folding container by hooking the hook directly through said elastic loop first end and extending a hook attached leader line having a loop over said dowel without additional retaining structure.

2. The hook and leader storage box of claim 1, wherein said container floats in water.

3. The hook and leader storage box of claim 1, further comprising a second snelled hook retaining means comprising a retaining loop for anchoring an elastic loop opposite said at least one row of dowels, wherein said hook is hooked directly through said elastic loop and a hook attached leader line with loop is extended to loop over one dowel of said row of dowels.

* * * * *